United States Patent [19]

Watanabe

[11] Patent Number: 4,891,655

[45] Date of Patent: Jan. 2, 1990

[54] THERMAL COLOR PRINTER

[75] Inventor: Tetsuo Watanabe, Tokyo, Japan

[73] Assignee: Ricoh Company, Ltd., Tokyo, Japan

[21] Appl. No.: 287,334

[22] Filed: Dec. 20, 1988

[30] Foreign Application Priority Data

Dec. 28, 1987 [JP] Japan ................................ 62-330255
Apr. 25, 1988 [JP] Japan ................................ 63-100371

[51] Int. Cl.[4] ................................................ G01D 15/00
[52] U.S. Cl. ...................................... 346/151; 400/64.9
[58] Field of Search .......... 346/150, 151, 157, 76 PH, 346/76 R, 134, 135.1; 400/120, 648, 649

[56] References Cited

U.S. PATENT DOCUMENTS 4,594,597 6/1986 Liu et al. ................................ 346/76
4,627,754 12/1986 Sholtis et al. ........................ 400/649
4,758,847 7/1988 Kossopoulos ........................ 346/151
4,804,979 2/1989 Kamas et al. ........................ 346/150

*Primary Examiner*—Arthur G. Evans

*Attorney, Agent, or Firm*—Cooper & Dunham

[57] ABSTRACT

A thermal color printer has a rotatable platen drum, clamp claws provided on the platen drum for clamping a tip end of a sheet of paper which is wrapped around an outer peripheral surface of the platen drum, a thermal printing head having a release position separated from the outer peripheral surface of the platen drum and a print position for printing an image on the paper, a mechanism for feeding an ink sheet between the thermal printing head and the paper on the platen drum, where the ink sheet has portions of n different colors so that a printing in n different colors completes while the platen drum undergoes n revolutions, and a paper pushing mechanism including at least a sliding member which has an active position for holding down the paper on the platen drum by making sliding contact with the paper while the platen drum rotates and an inactive position which is separated from the outer peripheral surface of the platen drum.

17 Claims, 5 Drawing Sheets

THERMAL COLOR PRINTER

BACKGROUND OF THE INVENTION

The present invention generally relates to thermal color printers, and more particularly to a thermal color printer provided with a mechanism for moving a sheet of paper on which a color image is printed.

A conventional thermal color printer generally has a thermal printing head and a platen drum on which a sheet of paper is clamped. The thermal color printer uses an ink sheet which has successive portions of n different colors to print in n colors during a time in which the platen drum undergoes n revolutions. In such a thermal color printer, a high accuracy is required of dot positions so that dot positions of corresponding dots printed by the ink of different colors coincide in order to obtain a satisfactory color image.

In order to match the dot positions of the corresponding dots for each of the colors used, it is essential that the sheet of paper clamped on the platen drum does not move. It was conventionally considered best to carry out the color printing in a state where a tip end portion of the paper is clamped on the platen drum because this method of printing was effective in reducing a skew of the paper. However, as the platen drum undergoes several revolutions, the paper inevitably moves with respect to the platen drum since only the tip end portion of the paper is clamped on the platen drum. In order to improve the quality of the printed color image, it is necessary to further improve the accuracy with which the dot positions of the corresponding dots for each of the colors used are matched but there conventionally is no thermal color printer which can meet such demands.

SUMMARY OF THE INVENTION

Accordingly, it is a general object of the present invention to provide a novel and useful thermal color printer in which the problems described above are eliminated.

Another and more specific object of the present invention is to provide a thermal color printer comprising a platen drum which is rotatable, driving means for rotating the platen drum in a predetermined rotating direction, clamp means provided on the platen drum for clamping a tip end of a sheet of paper which is wrapped around an outer peripheral surface of the platen drum, a thermal printing head having a release position separated from the outer peripheral surface of the platen drum and a print position for printing an image on the paper, moving means for moving the thermal printing head between the release position and the print position, feeding means for feeding an ink sheet between the thermal printing head and the paper on the platen drum, the ink sheet having portions of n different colors so that a printing in n different colors completes while the platen drum is driven by the driving means to undergo n revolutions, and paper pushing means including at least a sliding member which has an active position for holding down the paper on the platen drum by making sliding contact with the paper while the platen drum rotates and an inactive position which is separated from the outer peripheral surface of the platen drum. The platen drum and the paper pushing means respectively have first and second portions which cooperate to separate the sliding member from the outer peripheral surface of the platen drum giving a sufficient clearance between the sliding member and the outer peripheral surface of the platen drum for the clamp means to pass when the clamp means passes a position of the paper pushing means. The paper pushing means is located at a position leading the print position in the predetermined rotating direction. According to the thermal color printer of the present invention, it is possible to positively prevent a skew of the paper when the platen drum rotates. Hence, it is possible to obtain a printed color image of a high quality. In addition, a close contact is maintained between the paper and the platen drum regardless of the thickness of the paper due to the provision of the paper pushing means. Moreover, a slack in the paper, a skew of the paper, an error in the line pitch along the sub scanning direction and the like can be greatly reduced or eliminated.

Other objects and further features of the present invention will be apparent from the following detailed description when read in conjunction with the accompanying drawings.

DETAILED DESCRIPTION

Figure 1:
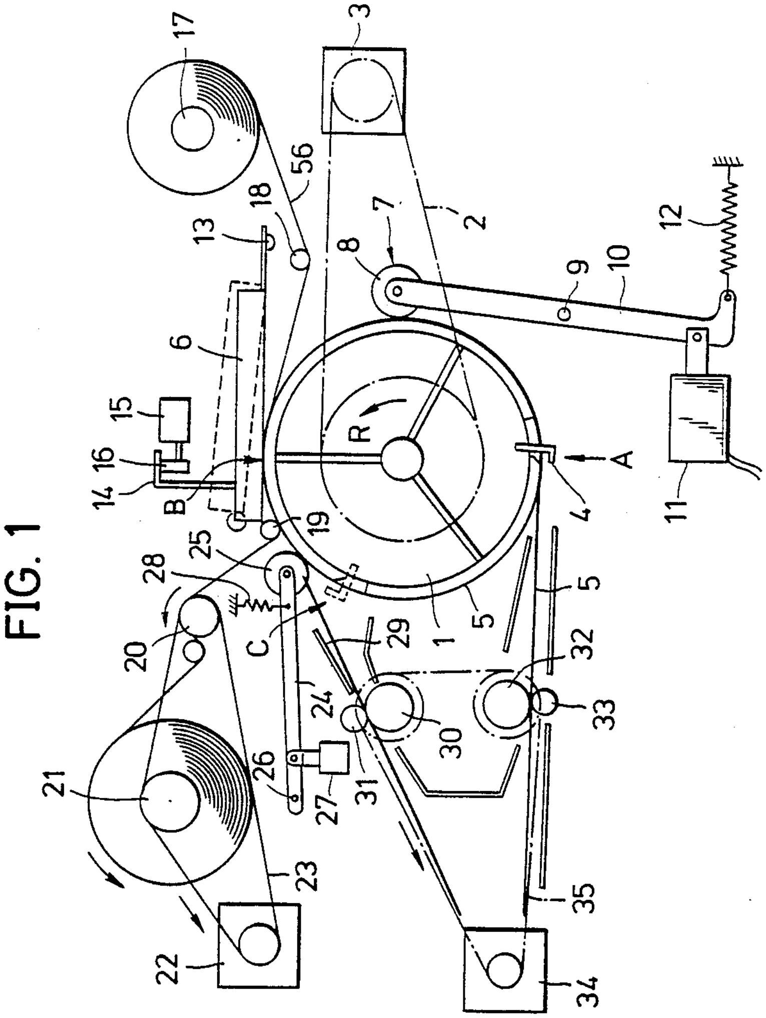
FIG. 1 is a side view generally showing an essential part of a first embodiment of a thermal color printer according to the present invention.

FIG. 1 generally shows an essential part of a first embodiment of a thermal color printer according to the present invention. In FIG. 1, a platen drum 1 is driven by a driving motor 3 through a timing belt 2 and rotated counterclockwise as indicated by an arrow R.

The platen drum 1 has clamp claws 4. A sheet of paper 5 on which a color image is to be printed is wrapped around an outer peripheral surface of the platen drum 1 in a home position A with a tip end portion of the paper 5 clamped on the platen drum 1 by the clamp claws 4. Hence, the paper 5 rotates together with the platen drum 1. As the platen drum 1 rotates, the paper 5 passes a printing position B where a printing takes place by a thermal printing head 6.

A paper pushing member 7 for pushing the paper 5 against the platen drum 1 is located at a position leading the thermal printing head 6 in a rotating direction R of the platen drum 1. The paper pushing member 7 has a sliding member 8 which makes sliding contact with the paper 5, and a lever 10 which is pivotally supported on a shaft 9 and supports the sliding member 8. The sliding member 8 may take a form of a roller as in the case of this embodiment or take a form of a resilient plate shaped member such as a metal leaf spring and a plastic leaf spring. The lever 10 can pivot between an active position where the sliding member 8 makes sliding contact with the paper 5 and an inactive position where the sliding member 8 is separated by a predetermined distance from the paper 5 or the outer peripheral surface of the platen drum 1. A plunger of a solenoid 11 is connected to an end of the lever 10 opposite to an end where the sliding member 8 is provided, and the solenoid 11 maintains the lever in the inactive position when turned ON. A spring 12 is also connected to the end of the lever 10 in a vicinity where the plunger of the solenoid 11 is connected so as to urge the lever 10 to pivot towards the active position.

The thermal printing head 6 is arranged so that it can tilt upwardly and downwardly about a fulcrum 13. An arm 14 fixed to the thermal printing head 6 acts as a cam follower to an eccentric cam 16 which is fixed to an output shaft of a thermal printing head release motor 15. When the thermal printing head release motor 15 operates, the thermal printing head 6 tilts upwardly or downwardly between a print position indicated by a solid line and a release position indicated by a phantom line.

An ink sheet 56 is arranged to make contact with the paper 5 on the platen drum 1 at the printing position B and thereabout. The ink sheet 56 is fed out from an ink sheet supply roll 17 and is guided by guides 18 and 19 to make contact with the paper 5 on the platen drum 1 at a predetermined position. After making contact with the paper 5 on the platen drum 1, the ink sheet 56 is guided by a take-up roller 20 and is taken up on an ink sheet take-up roll 21. The take-up roller 20 and the ink sheet take-up roll 21 are driven by a take-up motor 22 through a timing belt 23. For example, the ink sheet 56 has successive portions of n different colors which repeat in a predetermined sequence.

An ejection lever 24 is provided to eject the tip end of the paper 5 which is clamped on the platen drum 1 after the printing using the n different colors is completed. A push roller 25 which makes contact with the paper 5 on the platen drum 1 at a position slightly leading an ejecting position C in the rotating direction R is supported on a tip end of the ejection lever 24. The clamp claws 4 at the ejecting position C are indicated by a phantom line. The ejection lever 24 is pivotable upwardly and downwardly about a fulcrum 26, and a plunger of a solenoid 27 is connected to a base end of the ejection lever 24 to urge the ejection lever 24 in such a pivot direction that the push roller 25 makes contact with the paper 5 on the platen drum 1 when the solenoid 27 is turned ON. In addition, a spring 28 is connected in a vicinity of the tip end of the ejection lever 24 to urge the ejection lever in an opposite direction so that the push roller 25 separates from the paper 5 on the platen drum 1 when the solenoid 27 is turned OFF.

The thermal printing head 6 carries out the printing using the n different colors of the ink sheet 56 as the platen drum 1 and thus the paper 5 undergoes n revolutions, thereby forming a printed color image by overlapping images which are thermally transferred onto the paper 5 using the n different colors of the ink sheet 56. When the tip end of the paper 5 on which the printed color image has been formed reaches an ejection point and the solenoid 27 is turned ON so that the plunger thereof acts on the ejection lever 24 and urges the push roller 25 to make contact with the paper 5 on the platen drum 1, the tip end of the paper 5 is pushed up to separate from the platen drum 1 because the clamp claws 4 are released by an action of a mechanism which controls the clamp claws 4. Thereafter, the tip end of the paper 5 which is pushed upwardly as the platen drum 1 rotates is guided by an ejection guide 29 and is supplied to an ejection tray (not shown) by an ejection roller 30 in cooperation with a push roller 31. The push roller 31 pushes against the ejection roller 30 in a state where the paper 5 is pinched between these two rollers 30 and 31. For example, a mechanism for controlling the clamp claws 4 provided on the platen drum 1 is known in the art and disclosed for example in a Japanese patent application No. 62-278165 in which the applicant is the same as the assignee of the present application, U.S. Pat. No. 4,627,754 and U.S. Pat. No. 4,594,597.

When separating the paper 5 from the platen drum 1 to eject the paper 5 on the ejection tray, the solenoid 11 is turned ON to separate the sliding member 8 from the paper 5 on the platen drum 1 for the purpose of reducing the resistance on the paper 5 which is being ejected.

A supply roller 32 supplies the paper 5 from a paper supply part (not shown) to the home position A of the platen drum 1 in cooperation with a push roller 33. The push roller 33 pushes against the supply roller 32 in a state where the paper 5 is pinched between these two rollers 32 and 33. The supply roller 32 and the ejection roller 30 are driven by a paper supplying motor 34 through a timing belt 35.

When the paper 5 is supplied to the home position of the platen drum 1 and the tip end of the paper 5 is clamped on the platen drum 1 by the clamp claws 4, the paper 5 is wrapped around the outer peripheral surface of the platen drum 1 as the platen drum 1 rotates in the rotating direction R. When the tip end of the paper 5 clamped by the clamp claws 4 passes the position of the sliding member 8, the solenoid 11 is turned OFF so that the sliding member 8 makes contact with the paper 5 on the platen drum 1 by the action of the spring 12. Hence, the paper 5 is in close contact with the outer peripheral surface of the platen drum 1 with a pressure which is determined by the spring 12. A timing with which the solenoid 11 is turned ON and OFF is determined by a control signal from a control device (not shown) which also controls operation timings of various parts of the thermal color printer.

The thermal printing head 6 carries out the printing on the paper 5 at the printing position B in the n different colors by applying pressure and heat while the platen drum 1 undergoes n revolutions. For example, n=4 and the ink sheet 56 consists of yellow, magenta, cyan and black. When the printing in all of the n different colors is completed, the tip end of the paper 5 separates from the platen drum 1 at the ejecting position C and is ejected through the ejection guide 29.

In this embodiment shown in FIG. 1, the sliding member 8 is located at a position which leads the printing position B by approximately 90 degrees in the rotating direction R. In a best mode of the present invention, however, the sliding member 8 is located at such a position that the sliding member 8 still pushes on the paper 5 when the printing of a last line of a page is completed and thereafter ends the contact with the paper 5. In actual practice, such an arrangement of the sliding member 8 decreases a printing area on the paper 5, and the location of the sliding member 8 depends on the requirements of the thermal color printer such as a tolerable quantity of skew of the paper 5 and a layout of the printed color image on the paper 5.

The thermal printing head 6 separates from the paper 5 on the platen drum 1 by the operation of the thermal printing head release motor 15 and the eccentric cam 16 at a predetermined rotary position of the platen drum 1 mainly for three reasons. One reason is to prevent the clamp claws 4 of the platen drum 1 from hitting and damaging the thermal printing head 6. Another reason is to enable the ink sheet 56 to be fed smoothly after the printing in one color is completed. Still another reason is to reduce a resistance on the paper 5 when the paper 5 is being set on and ejected from the platen drum 1.

During the printing, the pressure applied on the paper 5 by the thermal printing head 6 becomes unbalanced along a line direction. As a result, a difference is introduced in a moving force or a moving quantity of the paper 5 at different portions thereof and a skew of the paper 5 occurs. In addition, a difference in a tension of the ink sheet 56 at different positions along a width direction thereof or a difference in a moving quantity of the ink sheet 56 at different portions thereof due to the different tensions causes the skew of the paper 5.

But when the sliding member 8 of the paper pushing member 7 is provided at a position leading the printing position B by an angle L in the rotating direction R, it is possible to apply on the paper 5 a force which substantially cancels the force which causes the skew of the paper 5 for the angular interval L. When a pressure of the sliding member 8 acting on the paper 5 is denoted by P and a coefficient of friction between the paper 5 and the platen drum 1 is denoted by M, a force $PM \times e^{ML}$ with which the paper 5 is pushed against and maintained on the platen drum 1 becomes greater than the force which causes the skew of the paper 5. For this reason, it is possible to effectively prevent the skew of the paper 5 by the provision of the paper pushing member 7.

Figure 2:
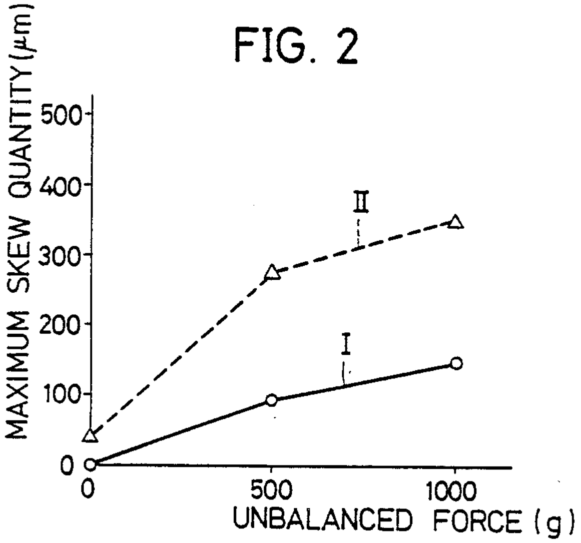
FIG. 2 shows effects of the existence and non-existence of a paper pushing member with respect to a skew.

FIG. 2 shows the effects of the existence and non-existence of the paper pushing member 7 with respect to the skew of the paper 5. In FIG. 2, the abscissa indicates an unbalanced force of the pressure applied by the thermal printing head 6 and the ordinate indicates a maximum skew quantity S of the paper 5. A characteristic I indicated by a solid line shows a case where the paper pushing member 7 is provided and a characteristic II indicated by a broken line shows a case where no paper pushing member is provided. These characteristics I and II were obtained from experiments conducted by carrying out the printing operation using three colors which are yellow, magenta and cyan and rotating the platen drum 1 for three revolutions. It may be seen from FIG. 2 that the skew of the paper 5 is considerably reduced by the provision of the paper pushing member 7 when compared to the case where no paper pushing member is provided.

When carrying out the color printing operation, the platen drum 1 undergoes a number of revolutions equal to a number of colors used for the printing, and during this time the sliding member 8 of the paper pushing member 7 continues to make sliding contact with the outer peripheral surface of the platen drum 1. Thus, the clamp claws 4 of the platen drum 1 would hit the sliding member 8 and at least the clamp claws 4 or the sliding member 8 would be damaged if no measure is taken to prevent this problem.

Figure 3:
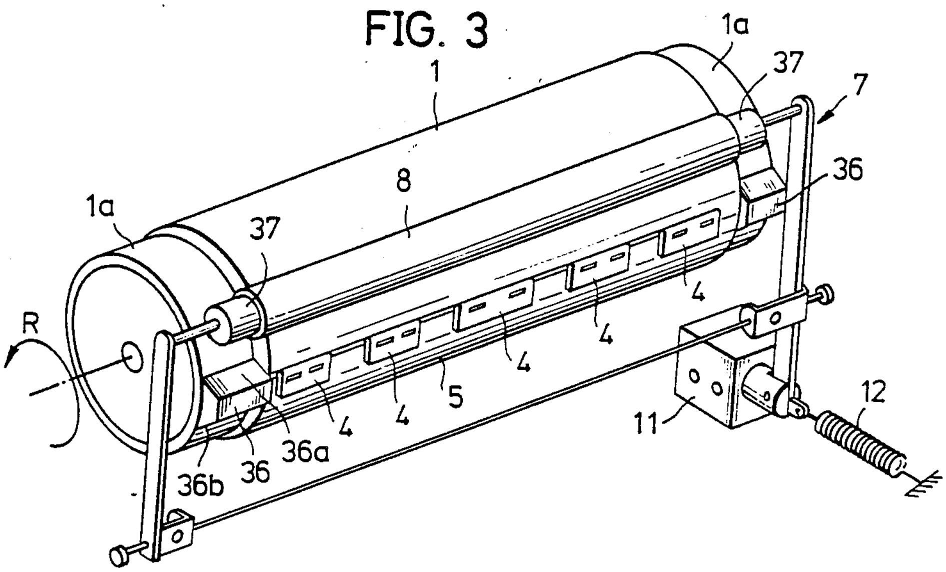
FIG. 3 is a perspective view showing a mechanism for making the paper pushing member recede from a moving path of clamp claws.

In order to eliminate this problem in this embodiment, cam members 36 are provided on respective flange portions 1*a* provided on both ends of the platen drum 1 as shown in FIG. 3. When the clamp claws 4 approach the position of the sliding member 8, separating portions 37 provided at respective ends of the sliding member 8 are pushed upwardly by the corresponding cam members 36 thereby separating the sliding member 8 a predetermined distance away from the platen drum 1. The cam members 36 are shaped so that a sufficient clearance is maintained between the clamp claws 4 and the sliding member 8 until the clamp claws 4 pass the position of the sliding member 8. Leading and trailing surfaces 36*a* and 36*b* of each cam members 36 are desirably smooth surfaces so that the sliding member 8 gently separates from and resumes contact with the paper 5 on the platen drum 1 in order to prevent a shock from being applied to the paper 5 upon separation and contact of the sliding member 8. By taking this measure, the paper 5 is unlikely to deviate in position as the sliding member 8 separates from and resumes contact with the platen drum 1.

Figure 4A:
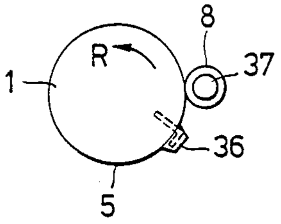
FIGS. 4A and 4B are side views respectively showing a platen drum in a state where the paper pushing member is in contact with the paper pushing member and in a state where the paper pushing member is separated from the platen drum.
Figure 4B:
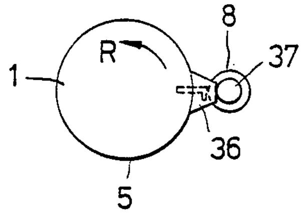

FIG. 4A shows the platen drum 1 and essential parts related thereto in a rotary position of the platen drum 1 where the sliding member 8 is in contact with the paper 5 on the platen drum 1. On the other hand, FIG. 4B shows the platen drum 1 and essential parts related thereto in a rotary position of the platen drum 1 where the sliding member 8 is separated from the paper 5 on the platen drum 1 by the cooperation of the cam members 36 and the corresponding separating portions 37.

It is of course possible to provide the separating portions 37 on the lever 10. In this case, it is necessary to set a timing with which the cam members 36 and the corresponding separating portions 37 cooperate so that the cooperation takes place at a time exactly when the clamp claws 4 pass the position of the sliding member 8.

It is also possible to make the sliding member 8 recede from the moving path of the clamp claws 4 by the operation of the solenoid 11, without the use of the cam members 36 and the corresponding separating portions 37. In this case, however, the control device (not shown) which controls the operating timing of the solenoid 11 must carry out a complex control to separate and contact the sliding member 8 with respect to the paper 5 on the platen drum 1 in addition to keeping the sliding member 8 in contact with the paper 5 during the printing and separating the sliding member 8 from the paper 5 during the ejection of the paper 5 after the printing. In addition, it is difficult to control the separation and contact so that the sliding member 8 gently separates from and resumes contact with the paper 5 on the platen drum 1.

When ejecting the paper 5 by the operation of the ejection lever 24, the thermal printing head 6 is moved to the release position and the paper pushing member 7 is moved to the inactive position. However, in a best mode of the invention, the thermal printing head 6 moves to the release position before the paper pushing member 7 moves to the inactive position. By controlling the moving timings of the thermal printing head 6 and the paper pushing member 7 in this manner, even when the clamp claws 4 of the platen drum 1 move from the ejecting position C to the home position A and the platen drum 1 stops, either the sliding member 8 or the thermal printing head 6 applies a pressure on a rear end of the paper 5 so as to facilitate the ejection of the paper 5. For this reason, it is possible to eliminate a waste of time such as rotating the platen drum 1 until the paper 5 is completely ejected. Hence, it is possible to minimize a time between the ejection of one paper 5 and the setting of a next paper 5 on the platen drum 1. Furthermore, the paper 5 can be ejected by the ejection roller 30 at a speed which is greater than a peripheral speed of the platen drum 1.

Figure 5:
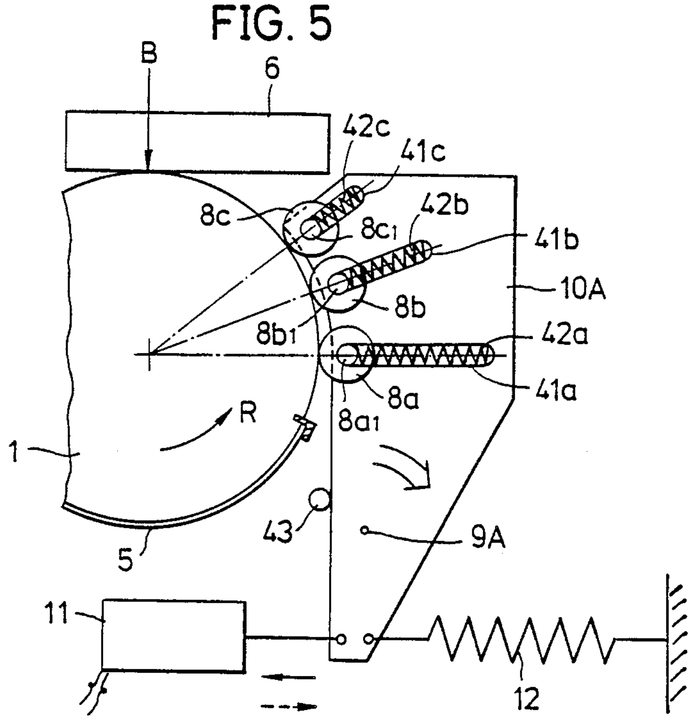
FIG. 5 is a side view generally showing an essential part of a second embodiment of the thermal color printer according to the present invention.

Next, a description will be given of a second embodiment of the thermal color printer according to the present invention. FIG. 5 shows an essential part of the second embodiment, and in FIG. 5, those parts which are essentially the same as those corresponding parts in FIG. 1 are designated by the same reference numerals or omitted, and a description thereof will be omitted. In this second embodiment, three paper push rollers 8*a*, 8*b* and 8*c* are provided in place of the single sliding member 8 of the first embodiment. It is of course possible to provide only two such rollers or more than three such rollers.

A lever 10A is pivotally supported on a shaft 9A, and a base end of the lever 10A is connected to the plunger of the solenoid 11. The paper push rollers 8*a*, 8*b* and 8*c* are rotatably supported on respective pins 8*a*1, 8*b*1 and 8*c*1 in a vicinity of a tip end of the lever 10A opposite to the base end thereof. The pins 8*a*1, 8*b*1 and 8*c*1 are arranged movable within corresponding elongated holes 41*a*, 41*b* and 41*c* provided in the lever 10A. The elongated holes 41*a*, 41*b* and 41*c* respectively extend generally in radial directions of the platen drum 1. Springs 42*a*, 42*b* and 42*c* are inserted within the respective elongated holes 41*a*, 41*b* and 41*c* and urge the corresponding pins 8*a*1, 8*b*1 and 8*c*1 towards the platen drum 1. Therefore, when the solenoid 11 is turned OFF and the lever 10A is in the active position by the action of the spring 12, the paper push rollers 8*a*, 8*b* and 8*c* push against the platen drum 1.

In this embodiment, forces exerted by the springs 42*a*, 42*b* and 42*c* are set so that the spring 42*c* which acts on the paper push roller 41*c* closest to the printing position B exerts a smallest force and the exerted force of the spring increases for the springs located further away from the printing position B. Hence, the spring 42*a* exerts the largest force in this embodiment.

In other words, a tension S1 of the spring 42*a* provided for the roller 41*a* which is most distant from the printing position B, a tension S2 of the spring 42*b* provided for the roller 41*b* which is next distant from the printing position B and a tension S3 of the spring 42*c* provided for the roller 41*c* which is closest to the printing position B satisfy a relation $S3<S2<S1$. By appropriately setting the tensions S1 through S3 of the springs 42*a* through 42*c*, the pushing force acting on the paper 5 to maintain close contact between the paper 5 and the platen drum 1 gradually decreases towards the printing position B.

Figure 6:
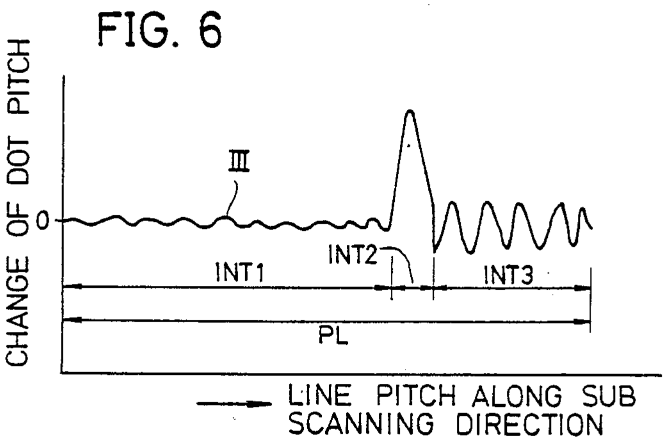
FIG. 6 shows a dot pitch deviation quantity versus line pitch in a sub scanning direction of the first embodiment.
Figure 7:
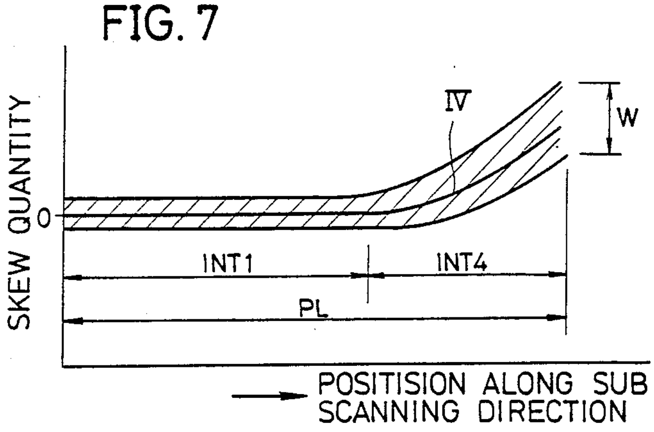
FIG. 7 shows a skew quantity versus a position along the sub scanning direction of the first embodiment.

In the first embodiment shown in FIG. 1, when the platen drum 1 rotates and the rear end of the paper 5 separates from the sliding member 8, a change in dot pitch may occur as indicated by a characteristic III in FIG. 6 due to a change in a load acting on the paper 5 which was subject to a tensional load between the thermal printing head 6 and the sliding member 8 or due to a change in a rotational load caused by the thermal printing head 6 acting on the platen drum 1. In FIG. 6, the abscissa indicates a line pitch along the sub scanning direction, the ordinate indicates a quantity of the change of the dot pitch, INT1 denotes an interval in which the sliding member 8 holds down the paper 5 on the platen drum 1 by making contact with the paper 5, INT2 denotes an interval in which the contact between the sliding member 8 and the paper 5 on the platen drum 1 ends thereby causing a relatively large change in the dot pitch, INT3 denotes an interval in which the sliding member 8 is not in contact with the paper 5 on the platen drum 1 and thus inactive in holding down the paper 5 on the platen drum 1, and PL denotes a printing length. Further, a skew indicated by a characteristic IV in FIG. 7 may occur when the sliding member 8 is no longer effective in holding down the paper 5 on the platen drum 1, and in this case, the images printed in the different colors may not match and hence deteriorate the quality of the printed color image. In FIG. 7, the abscissa indicates a position along the sub scanning direction, the ordinate indicates a skew quantity, $INT4=INT2+INT3$, and W denotes a width of an error in positions of 000 transferred images of n different colors on the paper 5.

However, according to the second embodiment, the paper 5 is always positively held down on the platen drum 1 by the paper push rollers 8*a* through 8*c* even in the vicinity of the printing position B. Therefore, the undesirable phenomenons shown in FIGS. 6 and 7 will not occur in the second embodiment. In other words, by providing a plurality of sliding members (or rollers), it is possible to minimize or virtually eliminate an interval in which no sliding member acts to hold down the paper 5 on the platen drum 1.

It is of course possible to employ plate shaped members in place of the paper push rollers 8*a*, 8*b* and 8*c* and obtain similar effects.

When ejecting the paper 5, the tip end of the paper 5 is pinched between the ejection roller 30 and the push roller 31 (shown in FIG. 1) and the paper 5 is thereafter ejected from the platen drum 1 at a high speed. For this reason, the paper push rollers 8*a*, 8*b* and 8*c* must separate from the paper 5 or the outer peripheral surface of the platen drum 1 with the release of the thermal printing head 6. In order to achieve this, the solenoid 11 is turned ON to pivot the lever 10A about the shaft 13 to the inactive position.

In the second embodiment, a positioning pin 43 is provided to prevent the lever 10A from approaching too close to the platen drum 1 when the solenoid 11 is OFF. This positioning pin 42 acts as a stopper for the lever 10A.

Figure 9:
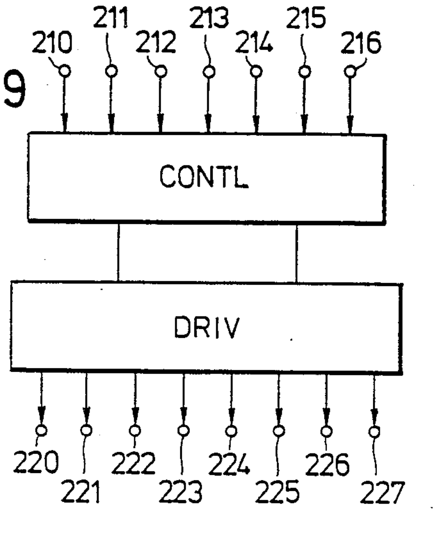
FIG. 9 is a system block diagram showing a control system for controlling the third embodiment.
Figure 8:
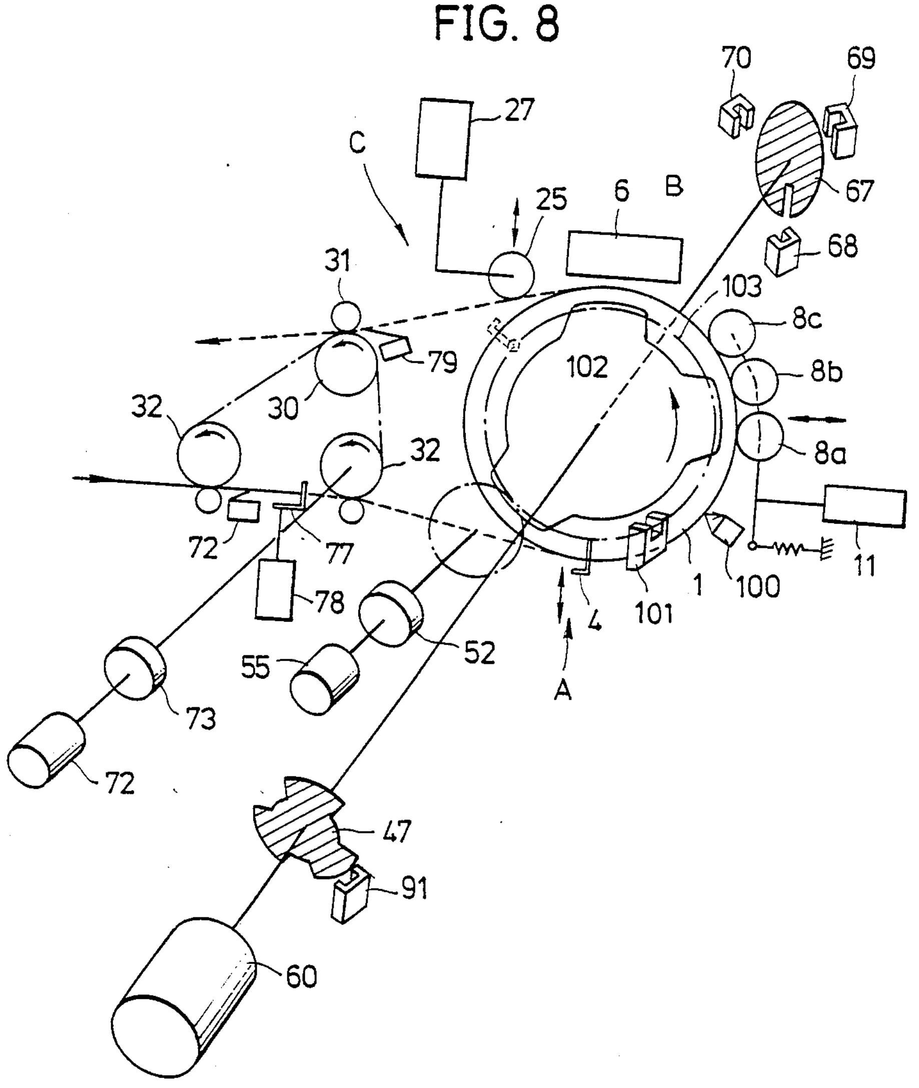
FIG. 8 shows an essential part of a third embodiment of the thermal color printer according to the present invention.

Next, a description will be given of a third embodiment of the thermal color printer according to the present invention. FIG. 8 shows an essential part of the third embodiment, and FIG. 9 shows a control system for controlling essential parts of the third embodiment of the thermal color printer. In FIG. 8, those parts which are essentially the same as those corresponding parts in FIGS. 1 and 5 are designated by the same reference numerals, and a description thereof will be omitted.

At the home position A, the clamp claws 4 of the platen drum 1 are located at a lower position and waits for the paper 5. A timing disc 67 is fixed coaxially on an end of the platen drum 1 and is rotatable therewith for use in detecting the rotational position of the platen drum 1. A timing disc 47 is fixed coaxially to a cam 102 and is rotatable therewith for use in detecting the rotational position of the cam 102. Hence, it is possible to stop the rotation of the platen drum 1 when the home position A is detected by a sensor 68.

When the paper 5 is supplied by the supply rollers 32, a microswitch 76 is turned ON. Responsive to the ON state of the microswitch 76, a step motor 72 is rotated and a clutch 73 is turned ON at the same time so as to move the paper 5 up to a position of a resist claw 77. Then, a solenoid 78 is turned ON to move the resist claw 77 out of a moving path of the paper 5 and permit the paper 5 to advance up to the clamp claws 4. During this time, a moving quantity of the paper 5 is controlled by the motor 72.

The clamp claws 4 move along a locus determined by the shape of the cam 102 which is provided coaxially to the platen drum 1 and is engaged to a oneway mechanical clutch. In other words, the cam 102 is rotated by a step motor 55 through a clutch 52 and a gear 103. A sensor 101 detects convex and concave portions or rotary positions of the cam 102.

After the clutches 73 and 52 are turned ON in this state, the paper 5 which is clamped by the clamp claws 4 moves to the printing position B as the platen drum 1 rotates in the direction R. A step motor 60 rotates the platen drum 1, and the printing position B is detected by a sensor 70. A clamp error detector 100 is used for detecting a clamping error as the paper 5 moves to the printing position B. The clamp error detector 100 outputs an error signal when the clamping error is detected. A sensor 69 is provided to detect the rotational position of the platen drum 1 where the clamp claws 4 would hit the thermal printing head 6 if the thermal printing head 6 is not moved to the release position from the print position.

When the platen drum 1 finishes n revolutions to complete the printing in n colors, the motor 60 is once stopped at a position which is reached when the motor 60 rotates a predetermined number of steps from the printing position B which is detected by the sensor 70. Thereafter, the clamp claws 4 are opened to release the paper 5 and then closed. Hence, the paper 5 can be separated from the outer peripheral surface of the platen drum 1. At the same time, the solenoid 27 is turned ON to push the push roller 25 against the surface of the platen drum 1. The push roller 25 rotates together with the rotation of the platen drum 1 and moves the paper 5 towards the rollers 30 and 31.

When the end of the paper 5 is detected by a sensor 79, the solenoid 11 is turned ON to release the paper push rollers **8*a* through 8*c*. At the same time, the motor 72 and the clutch 73 are turned ON to rotate the roller 30. When the end of the paper 5 is positively ejected by the rollers 30 and 31 under the control responsive to the ON/OFF state of the sensor 79, the solenoid 27 is turned OFF to release the push roller 25 and the ejection of the paper 5 is continued. In this state, the platen drum 1 passes the ejecting position C and stops at the home position A. Therefore, it is possible to eject the paper 5 without being restricted by the peripheral speed and moving quantity of the platen drum 1**.

In FIG. 9, a control system of the thermal color printer has a controller 200 and a driving circuit 201. The output of the sensor 101 is applied to a terminal 210, and the output of the clamp error detector 100 is applied to a terminal 211. The outputs of the sensors 68 through 70 are applied to respective terminals 212 through 214. The output of the microswitch 76 is applied to a terminal 215, and the output of the sensor 79 is applied to a terminal 216. The controller 200 generates control signals for controlling various parts of the thermal color printer based on the signals obtained from the terminals 210 through 216. The driving circuit 201 controls the various parts of the thermal color printer responsive to the control signals received from the controller 200. The control signals outputted from terminals 220 through 222 are respectively supplied to the motors 72, 60 and 55, and the control signals outputted from terminals 223 and 224 are respectively supplied to the clutches 73 and 52. In addition, the control signals outputted from terminals 225 through 227 are respectively supplied to the solenoids 78, 11 and 27.

It is of course possible to employ the control system shown in FIG. 9 in the first and second embodiments of the thermal color printer described before.

Further, the present invention is not limited to these embodiments, but various variations and modifications may be made without departing from the scope of the present invention.

What is claimed is:

1. A thermal color printer comprising:

a platen drum which is rotatable;

driving means for rotating said platen drum in a predetermined rotating direction;

clamp means provided on said platen drum for clamping a tip end of a sheet of paper which is wrapped around an outer peripheral surface of said platen drum;

a thermal printing head having a release position separated from the outer peripheral surface of said platen drum and a print position for printing an image on the paper;

moving means for moving said thermal printing head between said release position and said print position;

feeding means for feeding an ink sheet between said thermal printing head and the paper on said platen drum, said ink sheet having portions of n different colors so that a printing in n different colors completes while said platen drum is driven by said driving means to undergo n revolutions; and paper pushing means including at least a sliding member which has an active position for holding down the paper on said platen drum by making sliding contact with the paper while said platen drum rotates and an inactive position which is separated from the outer peripheral surface of said platen drum, said platen drum and said paper pushing means respectively having first and second portions which cooperate to separate said sliding member from the outer peripheral surface of said platen drum giving a sufficient clearance between said sliding member and the outer peripheral surface of said platen drum for said clamp means to pass when said clamp means passes a position of said paper pushing means, said paper pushing means being located at a position leading said print position in said predetermined rotating direction.

2. A thermal color printer as claimed in claim 1 in which said paper pushing means further includes a lever which is pivotally supported, said sliding member being provided on a first end of said lever, solenoid means connected to a second end of said lever opposite the first end for acting on said lever to position said sliding member to said active position when said solenoid means is turned ON, and spring means connected to the second end of said lever for acting on said lever to position said sliding member to said inactive position when said solenoid means is OFF.

3. A thermal color printer as claimed in claim 2 in which said solenoid means is turned OFF when said clamp means passes the position of said paper pushing means.

4. A thermal color printer as claimed in claim 2 in which said sliding member is constituted by a resilient plate shaped member.

5. A thermal color printer as claimed in claim 2 in which said sliding member is constituted by a rotatable roller.

6. A thermal color printer as claimed in claim 2 in which said sliding member leads said print position by approximately 90 degrees in said predetermined rotating direction when said paper pushing means takes said active position.

7. A thermal color printer as claimed in claim 1 in which said paper pushing means includes a plurality of sliding members and further includes a lever which is pivotally supported, said sliding members being provided in a vicinity of a first end of said lever, solenoid means connected to a second end of said lever opposite the first end for acting on said lever to position said sliding members to said active position when said solenoid means is turned ON, and first spring means connected to the second end of said lever for acting on said lever to position said sliding members to said inactive position when said solenoid means is OFF.

8. A thermal color printer as claimed in claim 7 in which said solenoid means is turned OFF when said clamp means passes the position of said paper pushing means.

9. A thermal color printer as claimed in claim 7 in which said sliding members are constituted by resilient plate shaped members.

10. A thermal color printer as claimed in claim 7 in which said sliding members are constituted by rotatable rollers.

11. A thermal color printer as claimed in claim 10 in which said paper pushing means further includes second spring means for urging said rotatable rollers in radial directions of said platen drum so as to make contact therewith in said active position.

12. A thermal color printer as claimed in claim 10 in which said second spring means includes a number of springs identical to a number of said rotatable rollers for applying forces thereon, said forces exerted by said springs being greater for the spring which is provided with respect to the rotatable roller further away from said print position.

13. A thermal color printer as claimed in claim 7 in which said sliding members are arranged within an angular range of approximately 90 degrees leading said print position in said predetermined rotating direction when said paper pushing means takes said active position.

14. A thermal color printer as claimed in claim 1 which further comprises setting means for setting the paper on said platen drum in a home position with the tip end of the paper clamped by said clamp means, and ejecting means for ejecting the paper on said platen drum in an ejecting position with the tip end of the paper released by said clamp means.

15. A thermal color printer as claimed in claim 14 in which said ejecting means includes a push roller which makes contact with the paper on said platen drum when ejecting the paper after the printing in the n different colors is completed.

16. A thermal color printer as claimed in claim 15 in which said moving means moves said thermal printing head to said release position before said sliding member of said paper push means moves to said inactive position when said ejecting means ejects the paper.

17. A thermal color printer as claimed in claim 1 in which a force $PM \times e^{ML}$ with which the paper is pushed against and maintained on said platen drum is greater than a force which causes a skew of the paper, where P denotes a pressure of the sliding member acting on the paper and M denotes a coefficient of friction between the paper and said platen drum.

* * * * *